United States Patent
Lurie et al.

(10) Patent No.: US 11,002,141 B2
(45) Date of Patent: May 11, 2021

(54) METHOD AND SYSTEM FOR LEADING EDGE AUXILIARY TURBINE VANES

(71) Applicant: General Electric Company, Schenectady, NY (US)

(72) Inventors: David Paul Lurie, Liberty Township, OH (US); Sherif Alykadry Abdelfattah, Mason, OH (US); Michael Julian Castillo, Liberty Township, OH (US); Anthony Louis DiPietro, Jr., Maineville, OH (US); Aspi Rustom Wadia, Loveland, OH (US); Gregory Burr Heitland, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 15/601,715

(22) Filed: May 22, 2017

(65) Prior Publication Data

US 2018/0334916 A1    Nov. 22, 2018

(51) Int. Cl.
*F01D 9/04* (2006.01)
*F01D 5/14* (2006.01)

(52) U.S. Cl.
CPC ............. *F01D 9/041* (2013.01); *F01D 5/146* (2013.01); *F05D 2240/121* (2013.01)

(58) Field of Classification Search
CPC ..... F01D 9/041; F01D 5/146; F05D 2240/121
See application file for complete search history.

(56) References Cited

U.S. PATENT DOCUMENTS

| 3,692,425 A | * | 9/1972 | Erwin | F04D 29/321 |
| | | | | 415/181 |
| 4,512,718 A | | 4/1985 | Stargardter | |
| 5,470,200 A | * | 11/1995 | Tupov | F04D 29/661 |
| | | | | 415/194 |

(Continued)

FOREIGN PATENT DOCUMENTS

| EP | 2806102 | 11/2014 |
| GB | 1198515 | 1/1970 |
| JP | S60142004 | 7/1985 |

OTHER PUBLICATIONS

Joslyn, H. David, and Robert P. Dring. "Negative Incidence Flow Over a Turbine Rotor Blade." In ASME 1983 International Gas Turbine Conference and Exhibit, pp. V001T01A011-V001T01A011. American Society of Mechanical Engineers, 1983.

(Continued)

*Primary Examiner* — Joseph J Dallo
*Assistant Examiner* — Kurt Philip Liethen
(74) *Attorney, Agent, or Firm* — Fitch, Even, Tabin & Flannery LLP

(57) ABSTRACT

An apparatus and method of managing negative incidence of an airfoil are provided. The apparatus includes a first row of stationary turbine main vanes and a second row of auxiliary vanes extending radially inwardly from a stationary casing of the turbine proximate the adjacent leading edge of the main vane. The apparatus also includes a flow channel defined between a pressure side of an auxiliary vane of the second row of auxiliary vanes and a suction side of an adjacent main vane of the row of stationary turbine main vanes.

20 Claims, 4 Drawing Sheets

(56) References Cited

U.S. PATENT DOCUMENTS

| | | | |
|---|---|---|---|
| 6,715,983 B2* | 4/2004 | Koshoffer | F01D 5/146 415/1 |
| 7,841,828 B2 | 11/2010 | Liang | |
| 7,887,297 B2 | 2/2011 | Allen-Bradley et al. | |
| 8,342,803 B2 | 1/2013 | Grohens et al. | |
| 8,403,645 B2 | 3/2013 | Barnes et al. | |
| 8,459,956 B2 | 6/2013 | Pandey et al. | |
| 8,534,997 B2 | 9/2013 | Guemmer | |
| 8,727,725 B1 | 5/2014 | Liang | |
| 8,757,965 B2* | 6/2014 | Baralon | F01D 9/065 415/142 |
| 9,103,213 B2 | 8/2015 | Barr et al. | |
| 9,739,154 B2* | 8/2017 | Derclaye | F04D 29/542 |
| 9,810,082 B2* | 11/2017 | Calza | F01D 9/04 |
| 2006/0133930 A1* | 6/2006 | Aggarwala | F01D 9/041 415/191 |
| 2011/0318172 A1 | 12/2011 | Hoeger | |
| 2013/0058776 A1* | 3/2013 | Domercq | F04D 29/544 415/209.1 |
| 2013/0209223 A1 | 8/2013 | Gomez et al. | |
| 2013/0224027 A1 | 8/2013 | Barr et al. | |
| 2014/0314549 A1 | 10/2014 | Pakkala et al. | |
| 2014/0328675 A1 | 11/2014 | Derclaye et al. | |
| 2014/0348660 A1* | 11/2014 | Guendogdu | F01D 5/145 416/242 |
| 2015/0240648 A1 | 8/2015 | Guemmer | |
| 2016/0215694 A1* | 7/2016 | Brostmeyer | F02C 3/107 |
| 2018/0306041 A1 | 10/2018 | Peters et al. | |
| 2018/0335051 A1 | 11/2018 | Lurie et al. | |

OTHER PUBLICATIONS

Schneider, Tim, and Dragan Kožulović. "Flow characteristics of axial compressor tandem cascades at large off-design incidence angles." In ASME Turbo Expo 2013: Turbine Technical Conference and Exposition, pp. V06AT35A011-V06AT35A011. American Society of Mechanical Engineers, 2013.

Belamadi, Riyadh, Abdelouaheb Djemili, Adrian Ilinca, and Ramzi Mdouki. "Aerodynamic performance analysis of slotted airfoils for application to wind turbine blades." Journal of Wind Engineering and Industrial Aerodynamics 151 (2016): 79-99.

Bai Tao, Research of Aerodynamic Performance of Turbine Blade with Different Loading Distribution at Wind Range Incidence, Journal of Ordanance Equipment Engineering, 2016, 163-167.

* cited by examiner

400

402 — CHANNELING A FLOW OF FLUID TO A ROW OF A PLURALITY OF STATIONARY TURBINE VANES, THE PLURALITY OF STATIONARY TURBINE VANES SPACED ABOUT A SURFACE OF A STATIONARY MACHINE CASING, THE PLURALITY OF STATIONARY TURBINE VANES INCLUDING A ROW OF MAIN VANES INTERDIGITATED WITH A ROW OF AUXILIARY VANES

404 — CHANNELING AT LEAST A PORTION OF THE FLOW OF FLUID THROUGH A FLOW CHANNEL DEFINED BY A PRESSURE SIDE OF AN AUXILIARY VANE AND A SUCTION SIDE OF A MAIN VANE

FIG. 4

METHOD AND SYSTEM FOR LEADING EDGE AUXILIARY TURBINE VANES

BACKGROUND

The field of the disclosure relates generally to gas turbine engines and, more particularly, to a method and system for managing negative incidence in turbine stator vanes using auxiliary airfoils.

At least some known gas turbine engines, such as, for example, variable cycle engines or adaptive cycle engines, are configured to operate efficiently under mixed flight conditions, such as subsonic, transonic and supersonic, and can effectively change the operating parameters of the compressors and/or turbines in a controlled way. During the wide range of operational conditions, turbine stator airfoils or vanes may operate at negative incidence, which can result in highly three dimensional separated flows on the pressure surface of the vanes of the turbine stator. The operation of turbine vanes at negative incidence in variable cycle engines can result in conditions that could adversely affect engine performance, efficiency, and/or operability or could shorten the life expectancy of the airfoils.

One condition of operating at a negative incidence or operating at a negative incidence that exceeds a certain threshold is a bluff body type separation of the flow from the surface of the airfoil. Such separation may introduce an undesirable vibratory mode to the airfoil or downstream airfoils. Additionally, the separation may cause a significant loss in turbine and/or engine overall performance.

BRIEF DESCRIPTION

In one aspect, a row of stationary turbine vanes includes a first row of main vanes extending radially inwardly from a stationary machine casing and spaced circumferentially about a first axial location of the stationary machine casing. Each main vane of the first row of main vanes includes a vane root coupled to the stationary machine casing, a distal tip end, and a main body extending therebetween. The main vane includes a first height from the stationary machine casing to the distal tip end, a chord length between a leading edge of the main airfoil and a trailing edge of the main airfoil, and a thickness. The row of stationary turbine vanes also includes a second row of auxiliary vanes extending radially inwardly from the stationary machine casing and spaced circumferentially about a second axial location of the stationary machine casing, wherein the second axial location is different from the first axial location. Each auxiliary vane of the second row of auxiliary vane includes an auxiliary vane root coupled to the stationary machine casing, a distal tip end, and an auxiliary vane extending therebetween. The auxiliary vane includes a second height from the stationary machine casing to the distal tip end, a chord length between a leading edge of the auxiliary airfoil and a trailing edge of the auxiliary airfoil, and a thickness. The row of stationary turbine vanes further includes a flow channel defined between a pressure side of an auxiliary vane of the row of auxiliary vanes and a suction side of a main vane of the row of main vanes that is proximate the leading edge of the main vane.

Optionally, the flow channel extends between the pressure side of the auxiliary vane and the suction side of main vane adjacent the auxiliary vane from the leading edge of the main vane to the trailing edge of the auxiliary vane. Also optionally, the flow channel extends between the pressure side of the auxiliary vane and the suction side of the main vane from the leading edge of the main vane to a position forward of a local maximum thickness of the main vane. The leading edge of the auxiliary vane may be positioned axially forward of the leading edge of the main vane. Optionally, the stationary machine casing includes at least one of a high pressure turbine rotor, a low pressure turbine rotor, a variable speed turbine, deswirler vanes in a centripetal compressor, and a steam turbine. The row of stationary turbine vanes may form a later stage of a turbine. Additionally, the second height may be approximately equal to the first height and the second height may be less than the first height.

In another aspect, a method of managing negative incidence of a stationary turbine vane includes channeling a flow of fluid to a row of a plurality of stationary turbine vanes, wherein the plurality of stationary turbine vanes are spaced about a surface of a stationary machine casing. The plurality of stationary turbine vanes includes a row of main vanes interdigitated with a row of auxiliary vanes. The method also includes channeling at least a portion of the flow of fluid through a flow channel defined by a pressure side of an auxiliary vane of the row of auxiliary vanes and a suction side of a main vane of the row of main vanes.

Optionally, the method further includes channeling the flow of fluid along the pressure side of the auxiliary vane before the flow of fluid enters the flow channel. Also optionally, the method includes maintaining a predetermined angle of incidence on the main vanes using the flow of fluid through the flow channel. Additionally, the method may include maintaining an angle of incidence on the main vanes less than or equal to sixty degrees and/or maintaining an angle of incidence on the main vanes less than or equal to twenty degrees. Optionally, the method may include maintaining a non-negative angle of incidence on the main vanes using the flow of fluid through the flow channel.

In yet another aspect, a gas turbine engine includes a rotor assembly that includes one or more bladed members coupled through a shaft rotatable about a longitudinal axis, and a stationary machine casing at least partially surrounding the rotor assembly. A plurality of vane pairs are spaced circumferentially about a first axial location of at least one of the stationary machine casing and the rotor assembly. Each of a main vane and an adjacent auxiliary vane of the plurality of vane pairs includes a vane leading edge, a vane trailing edge, and a vane body extending therebetween. The vane body includes a suction side and an opposing pressure side. The gas turbine engine also includes a flow channel defined between a pressure side of the auxiliary vane body and a suction side of the main vane body proximate the leading edge of the main vane.

Optionally, the flow channel extends between the pressure side of the vane body of the auxiliary vane and the suction side of the vane body of the main vane from the leading edge of the main vane to the trailing edge of the auxiliary vane. Also optionally, the flow channel extends between the pressure side of the vane body of the auxiliary vane and the suction side of the vane body of the main vane from the leading edge of the main vane to a position forward of a local maximum thickness of the vane body of the main vane. The leading edge of the vane body of the main vane may be positioned axially forward of the leading edge of the vane body of the auxiliary vane. Optionally, the rotor assembly includes at least one of a high pressure turbine rotor, a low pressure turbine rotor, a variable speed turbine, deswirler vanes in a centripetal compressor, and a steam turbine. Additionally, the plurality of vane pairs may form a later stage of a turbine.

DRAWINGS

These and other features, aspects, and advantages of the present disclosure will become better understood when the following detailed description is read with reference to the accompanying drawings in which like characters represent like parts throughout the drawings, wherein:

FIG. 4 is a flow chart of a method of managing negative incidence of an airfoil.

Figure 1:
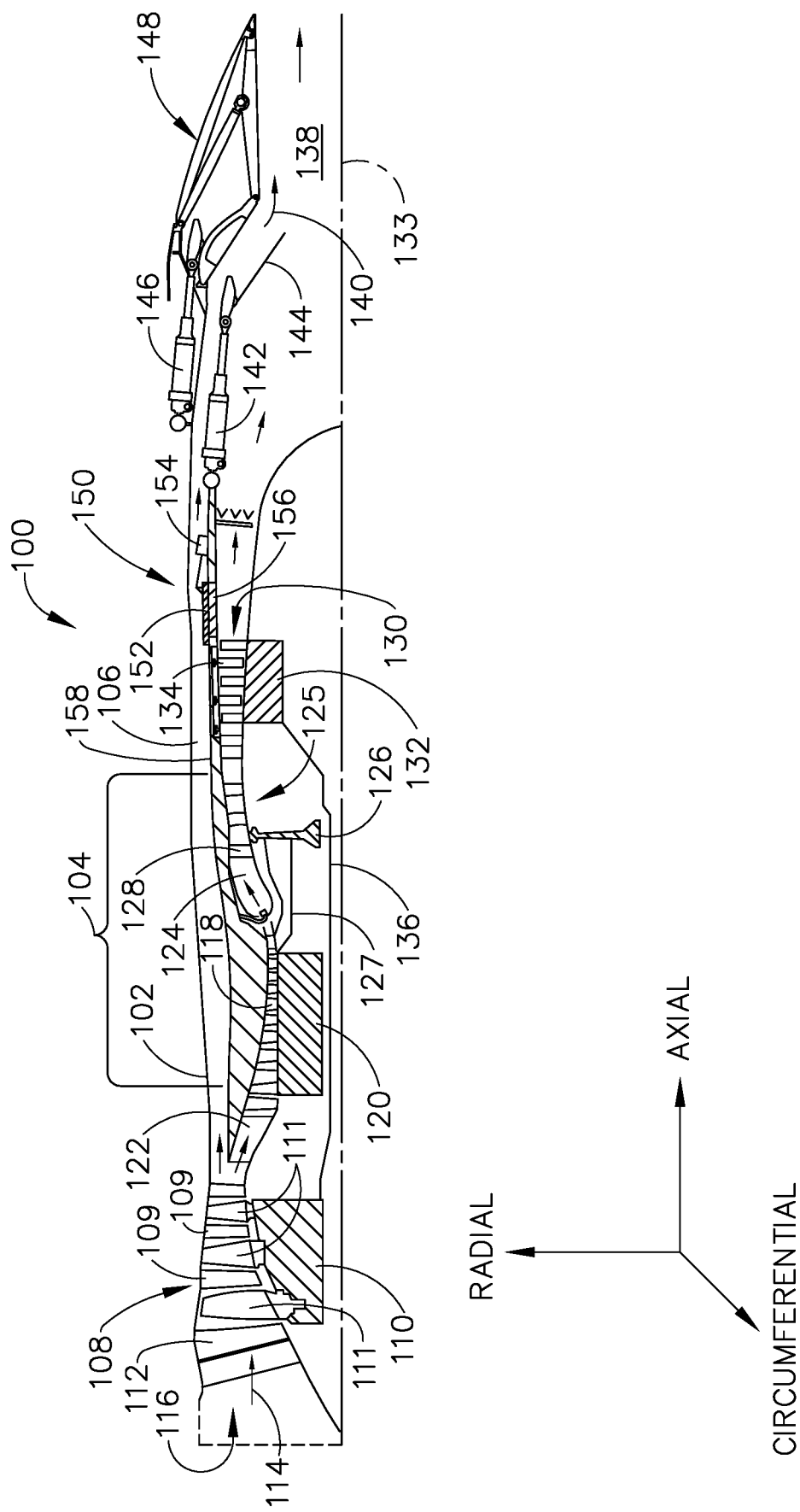
FIG. 1 is a cross-sectional view of a variable cycle gas turbine engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the term airfoils refers to both blades typically found on rotatable members, such as, but not limited to, rotors of machines and to stationary vanes typically found on, for example, casings of machines. In some instances, airfoils, blades, and vanes may be used interchangeably. Additionally, although some reference may be made to rotor blades the present disclosure is applicable to stator or stationary vanes as well. In some embodiments, the stator vanes may be shrouded, in that the tips of the vanes are ganged together or coupled together by a shroud. The shroud may gang the radially inner tips of vanes that extend from the casing or from a radially outer ring coupled to the casing. The radially outer tips of vanes may be shrouded, in some embodiments.

Embodiments of the negative incidence management techniques described herein provide a cost-effective method for reducing mechanical excitation of the affected row of vanes and downstream rows of airfoils, such as, but not limited to, downstream stator vanes and downstream turbine rotor blades caused by bluff body type flow separation. Additionally, such techniques facilitate mitigating a reduced performance of the turbine and/or the engine caused by the separation. Each row of turbine vanes taking advantage of the negative incidence management techniques described herein includes a first row of main vanes and a second row of auxiliary vanes extending circumferentially about the turbine stator or casing. In an exemplary embodiment, the auxiliary vanes are smaller than the main vanes and are positioned axially at least partially forward of the main vanes. The auxiliary vanes are interdigitated with the main vanes, such that main vanes and auxiliary vanes alternate circumferentially around the turbine stator or casing. A flow channel is thereby formed between each pair of auxiliary vanes and main vanes. Specifically, the flow channel is formed between a pressure side of an auxiliary vane of the pair and a suction side of an adjacent main vane of the pair that pulls incoming flow around the auxiliary vane, between the auxiliary vane and main vane to prevent or reduce flow separation on the pressure side of the main blade. Such techniques find applicability in turbines of gas turbine engines, variable speed turbines, as well as in deswirler vanes in a centripetal compressor.

FIG. 1 is a cross-sectional view of a gas turbine engine 100 in accordance with an example embodiment of the present disclosure. Gas turbine engine 100 can be an adaptive cycle or variable cycle engine. In the example embodiment, gas turbine engine 100 includes an outer casing or outer nacelle 102 spaced apart from an inner core engine 104 so as to define an annular bypass duct 106 therebetween. Variable cycle gas turbine engine 100 includes a fan assembly 108 having stator vanes 109, a three-stage rotor assembly 110, including rotor blades 111, and inlet guide vanes 112 disposed between rotor stages and extending radially inward from outer nacelle 102. Fan assembly 108 receives an inlet airflow 114 from an inlet opening 116, and thereupon pressurizes inlet airflow 114, a portion of which is delivered to the core engine 104 and the remainder of which is directed to bypass duct 106. Inlet opening 116 is sized to accept a predetermined design airflow. Core engine 104 includes an axial flow high pressure compressor 118 having a high pressure compressor rotor assembly 120. Pressurized air entering high pressure compressor 118 through a flow annulus 122 is compressed and then discharged to a combustor 124 where fuel is burned to provide high energy combustion gases which drive a high pressure turbine 125 having a high pressure turbine rotor 126. High pressure turbine rotor 126 operates to extract kinetic energy from the high velocity core gas stream exiting combustor 124, and to convert this kinetic energy into torque for driving high pressure compressor rotor assembly 120 through a high pressure shaft 127. For the purpose of providing additional control of the core engine flow, variable pitch inlet guide vanes 128 may be provided upstream of high pressure turbine rotor 126.

Disposed downstream of high pressure turbine 125, in a position to receive the flow of hot gases leaving core engine 104, is a low pressure turbine 130, sometimes referred to as a power turbine. Low pressure turbine 130 includes a low pressure turbine rotor assembly 132 and variable pitch inlet guide vane sections 134. While low pressure turbine rotor assembly 132 has been illustrated as comprising three stages, it will be apparent to those skilled in the art that a smaller or greater number of stages may be utilized depending upon the turbine energy extraction potential required. Inlet guide vane sections 134 operate to convert kinetic energy from the core stream into torque and to deliver this torque to low pressure turbine rotor assembly 132 which in turn drives rotor assembly 132 through an upstream extending drive shaft 136 connected for rotation with rotor assemblies 110 and 132. High pressure shaft 127 and drive shaft 136 are rotatable about a longitudinal axis 133 of gas turbine engine 100.

The cross-sectional flow area to low pressure turbine rotor assembly 132 is varied by varying the pitch of variable pitch inlet guide vane sections 134 which acts to vary the back pressure on high pressure turbine 125 and thereby control the high pressure turbine rotor speed. Propulsive force is obtained by the discharge of combustion gases from core engine 104 through a variable area core nozzle 138. Propulsive force is also obtained by the action of fan assembly 108 discharging air through variable area bypass nozzle 140 concentric to core nozzle 138. To assist in modulating the flow in bypass duct 106 and core engine 104, the area of bypass nozzle 140 and core nozzle 138 may be varied by a suitable variable geometry. As illustrated, the variable geometry may comprise a plurality of linear actuators 142 controlling hinged bypass nozzle flaps 144 and a second plurality of linear actuators 146 controlling a collapsible hinged wall assembly 148 to vary the cross-sectional area of core nozzle 138. Hinged bypass nozzle flaps 144 may be moved to a closed position, wherein variable area bypass nozzle 140 is obtruded such as that no flow is exhausted therefrom.

Aft of the low pressure turbine 130 there is provided an annular diverter valve 150. Diverter valve 150 may comprise a hinged panel 152 under control of a linear actuator 154. Hinged panel 152 covers a plurality of vanes 156 in the inner wall or nacelle 158 separating the bypass duct 106 and core engine 104, and which are curved to promote mixing of the core and bypass gas streams. In its open position, hinged panel 152 uncovers vanes 156 which permits the bypass flow to mix with the core stream. In its closed position, hinged panel 152 covers vanes 156 to prevent mixing of the core and bypass gas streams.

Diverter valve 150, in combination with the hinged bypass nozzle flaps 144, are used to switch the basic engine mode of operation between a separated flow, high bypass, low thrust cycle, to a mixed flow, low bypass, high thrust static pressure balanced cycle.

Variable cycle gas turbine engine 100 is depicted in the figures by way of example only, in other exemplary embodiments, gas turbine engine 100 may have any other suitable configuration including for example, a turboprop engine, a military purpose engine, and a marine or land-based aeroderivative engine.

Variable cycle gas turbine engine 100 is suitable for use as an aircraft power plant. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, embodiments of the present disclosure are contemplated for utilization in other applications that may not be coupled with an aircraft such as, for example, industrial applications, power generation, pumping sets, naval propulsion, weapon systems, security systems, perimeter defense/security systems, and the like.

Although gas turbine engine 100 is shown as a single-spool, axial flow engine, other engine types and configurations are also possible. In one non-limiting example, high pressure compressor 118 can include a high pressure and a low pressure compressor, and in some forms may include a mixed axial/centrifugal flow compressor sections. Furthermore, in some embodiments, gas turbine engine 100 can take the form of a turbofan, turboprop, turbojet, or turboshaft engine suitable for use as a power plant at a variety of flight conditions. Other variations and combinations of gas turbine engine 100 are also contemplated herein.

Figure 2:
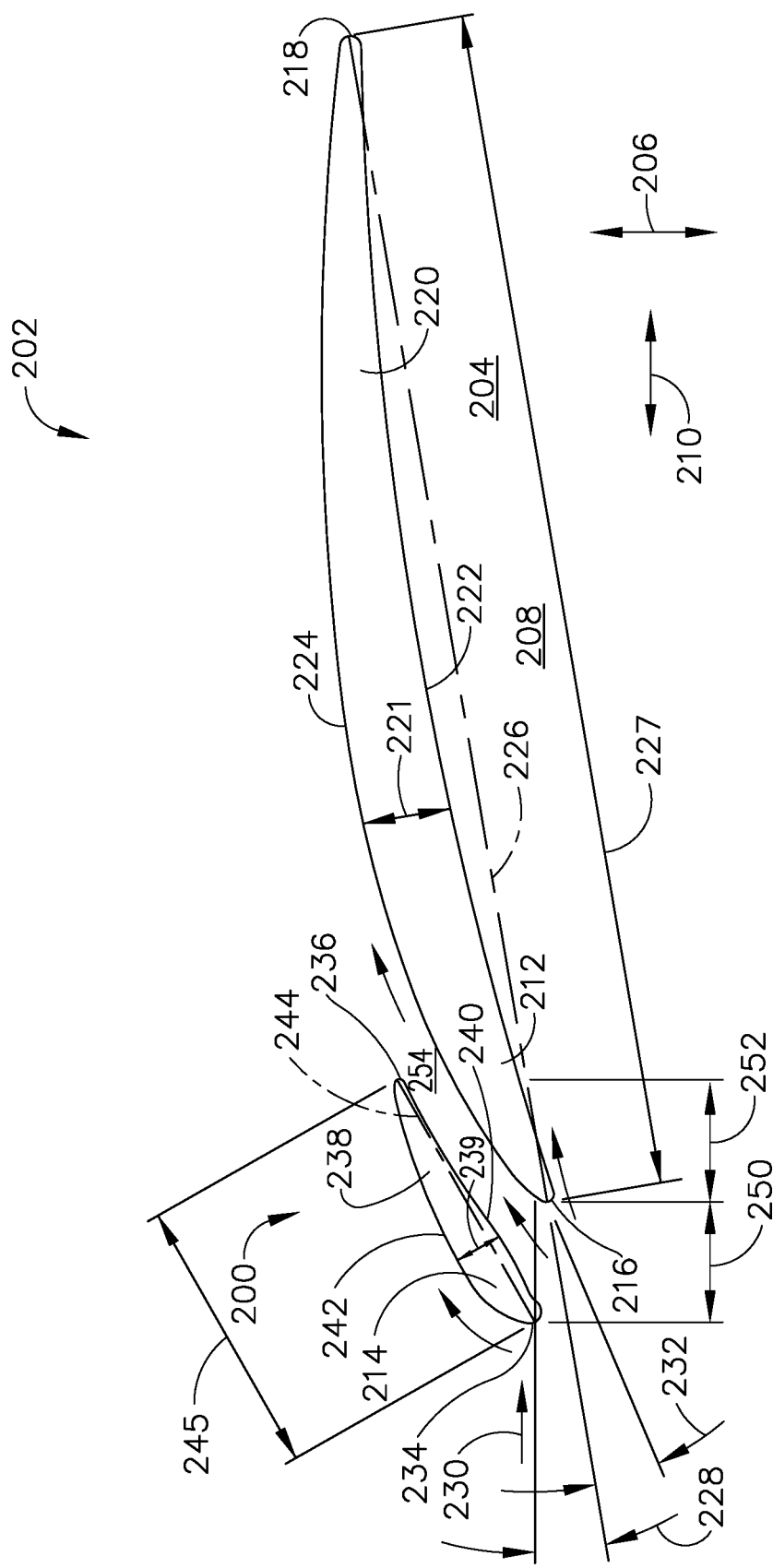
FIG. 2 is a plan view, looking radially inwardly, of a row of airfoil pairs in accordance with an example embodiment of the present disclosure.
Figure 3:
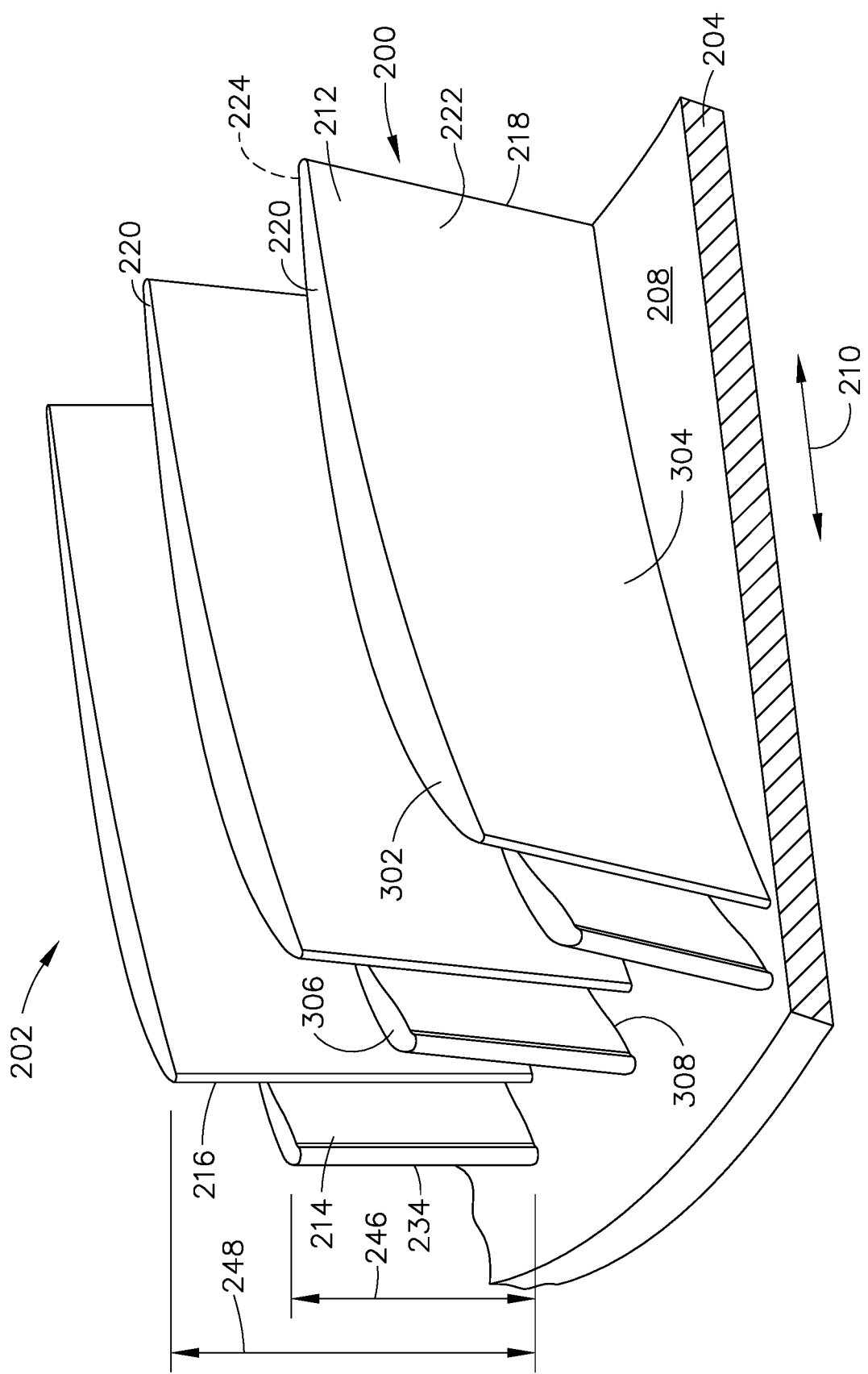
FIG. 3 is a perspective view of the row of airfoil pairs shown in FIG. 2.

FIG. 2 is a plan view, looking radially outwardly, of a row of vane pairs 200 in accordance with an example embodiment of the present disclosure. FIG. 3 is a perspective view of row of vane pairs 200. In the example embodiment, row of vane pairs 200 is a row of stationary vanes implemented in a stage 202 of a stationary machine casing 204, such as high pressure turbine 125 or low pressure turbine 130 (both shown in FIG. 1). Row of vane pairs 200 extends in a circumferential direction 206 about a radially inner surface 208 of stationary machine casing 204 at a predetermined range in an axial direction 210. Row of vane pairs 200 along with an associated row of rotor blades, if any (not shown in FIG. 2), form stage 202. Row of vane pairs 200 includes a row of main vanes 212 interdigitated with a row of auxiliary vanes 214. Each main vane 212 includes a leading edge 216, a trailing edge 218, and a main vane airfoil body 220 extending therebetween. Each main vane 212 also includes a main vane distal tip end 302, a main vane root 304, and main vane airfoil body 220 extending therebetween. A thickness 221 of main vane airfoil body 220 varies axially between leading edge 216 and trailing edge 218. Main vane 212 includes a pressure side 222 and a suction side 224. A chord line 226 extends between leading edge 216 and trailing edge 218 and defines a chord length 227. In one embodiment, an angle of incidence 228, 232 is defined as the angle between chord line 226 and an incoming flow 230 entering stage 202. In the example embodiment, incoming flow 230 is illustrated as a straight axial flow, however, incoming flow 230 can vary angularly through the many operational conditions experienced by gas turbine engine 100, high pressure turbine 125 and low pressure turbine 130. For example, changing incoming flow 230 can result in positive angle of incidence 228, as illustrated in FIG. 2, or negative angle of incidence 232. An excessive negative angle of incidence 232 can cause flow separation on pressure side 222, in which flow along pressure side 222 undergoes a separation of the flow from pressure side 222, for example, a bluff body separation of a laminar flow.

Each auxiliary vane 214 includes a leading edge 234, a trailing edge 236, and an auxiliary vane airfoil body 238 extending therebetween. Each auxiliary vane 214 also includes an auxiliary vane distal tip end 306, an auxiliary vane root 308, and auxiliary vane airfoil body 238 extending therebetween. A thickness 239 of auxiliary vane airfoil body 238 varies axially between leading edge 234 and trailing edge 236. Auxiliary vane 214 includes a pressure side 240 and a suction side 242. A chord line 244 extends between leading edge 234 and trailing edge 236 and defines a chord length 245. In the example embodiment, as shown in FIG. 2, auxiliary vane 214 is dimensionally smaller than main vane 212, in that chord line 244 is shorter than chord line 226. A second height 246 of auxiliary vane 214 is shorter than a first height 248 of main vane 212. In alternative embodiments, auxiliary vane 214 is dimensionally larger than main vane 212, in that chord line 244 is longer than chord line 226. In other alternative embodiments, chord line 226 and 244 are of equal length.

In the example embodiment, main vane 212 is positioned at a first axial location and auxiliary vane 214 is positioned at a second axial location that is different from the first axial location. More specifically, in the example embodiment, auxiliary vane 214 is positioned upstream from main vane 212 by a first predetermined distance 250. Trailing edge 236 is spaced axially aftward from leading edge 216 a second predetermined distance 252. A flow channel 254 is defined along first predetermined distance 250 only by pressure side 240 and along second predetermined distance 252 by pressure side 240 and suction side 224.

A size and position of auxiliary vane 214 with respect to main vane 212 defines a size and shape of flow channel 254. In the example embodiment, flow channel 254 extends between pressure side 240 and suction side 224 from leading edge 216 of main vane 212 to trailing edge 236 of auxiliary vane 214. Moreover, in the example embodiment, flow channel 254 extends between pressure side 240 and suction side 224 from leading edge 216 of main vane 212 to a position forward of a local maximum thickness 221 of main vane 212. Flow channel 254 is configured to maintain a more positive angle of incidence 228 than would otherwise occur in the absence of flow channel 254. Flow channel 254 redirects flow at leading edge 216 towards suction side 224 thereby facilitating maintaining a more positive angle of incidence 228. In alternative embodiments, flow channel 254 extends to any suitable extent that enables row of airfoil vane pairs 200 to function as described herein.

In some embodiments, flow channel 254 facilitates maintaining a predetermined angle of incidence 228 on main vanes 212. For example, flow channel 254 facilitates maintaining angle of incidence 228 at less than or equal to sixty degrees. For another example, flow channel 254 facilitates maintaining angle of incidence 228 at less than or equal to twenty degrees. For another example, flow channel 254 facilitates maintaining angle of incidence 228 at a non-negative angle. In alternative embodiments, flow channel 254 facilitates maintaining angle of incidence 228 at any suitable value.

Although illustrated and described primarily with reference to rows of vanes, for example, as used in rotatable machinery stators, the auxiliary airfoil concept also applies to rows of blades on a rotatable machine rotor. Additionally, the auxiliary airfoil concept applies to any stage of the machine including the first stage and later stages, as well as to guide vanes and fan vanes.

FIG. 4 is a flow chart of a method 400 of managing negative incidence of a turbine stationary vane. In the example embodiment, method 400 includes channeling 402 a flow of fluid to a row of a plurality of airfoil assemblies coupled to a surface of a stationary member. The plurality of airfoil assemblies are spaced circumferentially about the surface of the stationary member. Each airfoil assembly of the plurality of airfoil assemblies including a row of main airfoils interdigitated with a row of auxiliary airfoils. Method 400 also includes channeling 404 at least a portion of the flow of fluid through a channel defined by a pressure side of the auxiliary airfoil and a suction side of the main airfoil.

The above-described case, gas turbine engine and method provide an efficient technique for managing incidence in bladed stationary machines, particularly turbines of the kind used in gas turbine engines, steam turbine engines, variable speed turbines, deswirler vanes in centripetal compressors, and the like. Specifically, the above-described incidence management system includes a row of auxiliary vanes interdigitated with a row of main vanes to form a stage of the machine. A flow channel formed between the auxiliary vane and main vane pulls incoming flow around the auxiliary vane, between the auxiliary vane and main vane to prevent or reduce flow separation on the pressure side of the main vane.

The above-described embodiments of a method and apparatus for managing incidence in a bladed stationary machine provides a cost-effective and reliable means for passive improvement of incidence over a wide range of machine operating conditions. More specifically, the methods and apparatus described herein facilitate maintaining a less negative angle of incidence on the main vanes of the machine than would otherwise be expected. As a result, the methods and apparatus described herein facilitate improving performance, efficiency, and operability of the machine, in addition to increasing a life of the machine in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine assembly comprising:
   a first row of turbine main vanes extending radially inwardly from a stationary machine casing and spaced circumferentially about a first axial location of said stationary machine casing, each turbine main vane of said first row of turbine main vanes comprising a vane root coupled to said stationary machine casing, a distal tip end, and a main vane body extending therebetween, said turbine main vane comprising a first height from the stationary machine casing to said distal tip end, a chord length between a leading edge of said turbine main vane and a trailing edge of said turbine main vane, and a thickness;
   a second row of turbine auxiliary vanes, upstream of the first row of turbine main vanes, extending radially inwardly from said stationary machine casing and spaced circumferentially about a second axial location of said stationary machine casing, said second axial location is different from said first axial location, each turbine auxiliary vane of said second row of turbine auxiliary vanes comprising an auxiliary vane root coupled to said stationary machine casing, a distal tip end, and an auxiliary vane extending therebetween, said turbine auxiliary vane comprising a second height from said stationary machine casing to said distal tip end, a chord length between a leading edge of said auxiliary vane and a trailing edge of said auxiliary vane, and a thickness, wherein the second chord length is less than the first chord length; and a flow channel defined between a concave pressure side of a turbine auxiliary vane of said row of turbine auxiliary vanes and a convex suction side of a turbine main vane of said row of turbine main vanes that is proximate the leading edge of the turbine main vane, wherein the turbine auxiliary vane of the row of turbine auxiliary vanes does not cross a chord line of the turbine main vane of the row of turbine main vanes.

2. The turbine assembly of claim 1, wherein said flow channel extends between said pressure side of said turbine auxiliary vane and said suction side of turbine main vane adjacent said turbine auxiliary vane from said leading edge of said turbine main vane to said trailing edge of said turbine auxiliary vane.

3. The turbine assembly of claim 1, wherein said flow channel extends between said pressure side of said turbine auxiliary vane and said suction side of said turbine main vane from said leading edge of said turbine main vane to a position forward of a local maximum thickness of said turbine main vane.

4. The turbine assembly of claim 1, wherein said leading edge of said turbine auxiliary vane is positioned axially forward of said leading edge of said turbine main vane.

5. The turbine assembly of claim 1, wherein said stationary machine casing comprises at least one of a high pressure turbine rotor, a low pressure turbine rotor, a variable speed turbine, and a steam turbine.

6. The turbine assembly of claim 1, wherein said turbine assembly forms a later stage of a turbine.

7. The turbine assembly of claim 1, wherein said second height is approximately equal to said first height.

8. The turbine assembly of claim 1, wherein said second height is less than said first height.

9. A method of managing negative incidence of a stationary turbine vane, said method comprising:

channeling a flow of fluid to a row of a plurality of stationary turbine vanes, the plurality of stationary turbine vanes spaced about a surface of a stationary machine casing, the plurality of stationary turbine vanes including a row of turbine main vanes interdigitated with a row of turbine auxiliary vanes wherein the row of turbine auxiliary vanes is positioned upstream of the row of turbine main vanes, and wherein a turbine auxiliary vane of the row of turbine auxiliary vanes has a chord length less than a chord length of a turbine main vane of the row of turbine main vanes; and channeling at least a portion of the flow of fluid through a flow channel defined by a concave pressure side of a turbine auxiliary vane of the row of turbine auxiliary vanes and a convex suction side of a turbine main vane of the row of turbine main vanes, wherein the turbine auxiliary vane of the row of turbine auxiliary vanes does not cross a chord line of the turbine main vane of the row of turbine main vanes.

10. The method of claim 9, further comprising channeling the flow of fluid along the pressure side of the turbine auxiliary vane before the flow of fluid enters the flow channel.

11. The method of claim 9, further comprising maintaining a predetermined angle of incidence on the turbine main vanes using the flow of fluid through the flow channel.

12. The method of claim 9, further comprising maintaining an angle of incidence on the turbine main vanes less than or equal to sixty degrees.

13. The method of claim 9, further comprising maintaining an angle of incidence on the turbine main vanes less than or equal to twenty degrees.

14. The method of claim 9, further comprising maintaining a non-negative angle of incidence on the turbine main vanes using the flow of fluid through the flow channel.

15. A gas turbine engine comprising:

A turbine rotor assembly comprising one or more turbine bladed members coupled through a shaft rotatable about a longitudinal axis; a stationary machine casing at least partially surrounding said turbine rotor assembly;

a plurality of turbine vane pairs spaced circumferentially about a first axial location of at least one of said stationary machine casing and said turbine rotor assembly, each of a turbine main vane and an adjacent turbine auxiliary vane of said plurality of turbine vane pairs comprising a leading edge, a trailing edge, and a vane body extending therebetween, said vane body comprising a suction side and an opposing pressure side, wherein the turbine auxiliary vane is positioned upstream of the turbine main vane and has a chord length less than a chord length of the turbine main vane; and a flow channel defined between a concave pressure side of said vane body of said adjacent turbine auxiliary vane and a convex suction side of said vane body of said turbine main vane proximate said leading edge of said turbine main vane, wherein the turbine auxiliary vane of the row of turbine auxiliary vanes does not cross a chord line of the turbine main vane of the row of turbine main vanes.

16. The gas turbine engine of claim 15, wherein said flow channel extends between said pressure side of said vane body of said adjacent turbine auxiliary vane and said suction side of said vane body of said turbine main vane from said leading edge of said turbine main vane to said trailing edge of said turbine auxiliary vane.

17. The gas turbine engine of claim 15, wherein said flow channel extends between said pressure side of said vane body of said adjacent turbine auxiliary vane and said suction side of said vane body of said turbine main vane from said leading edge of said turbine main vane to a position forward of a local maximum thickness of said vane body of said turbine main vane.

18. The gas turbine engine of claim 15, wherein said leading edge of said vane body of said turbine main vane is positioned axially forward of said leading edge of said vane body of said adjacent turbine auxiliary vane.

19. The gas turbine engine of claim 15, wherein said turbine rotor assembly comprises at least one of a high pressure turbine rotor, a low pressure turbine rotor, a variable speed turbine, and a steam turbine.

20. The gas turbine engine of claim 15, wherein said plurality of turbine vane pairs form a later stage of a turbine.

* * * * *